No. 848,446. PATENTED MAR. 26, 1907.
G. CROWELL, DEC'D.
J. H. CROWELL, EXECUTRIX.
LUBRICATING SYSTEM.
APPLICATION FILED DEC. 10, 1904.
2 SHEETS—SHEET 1.
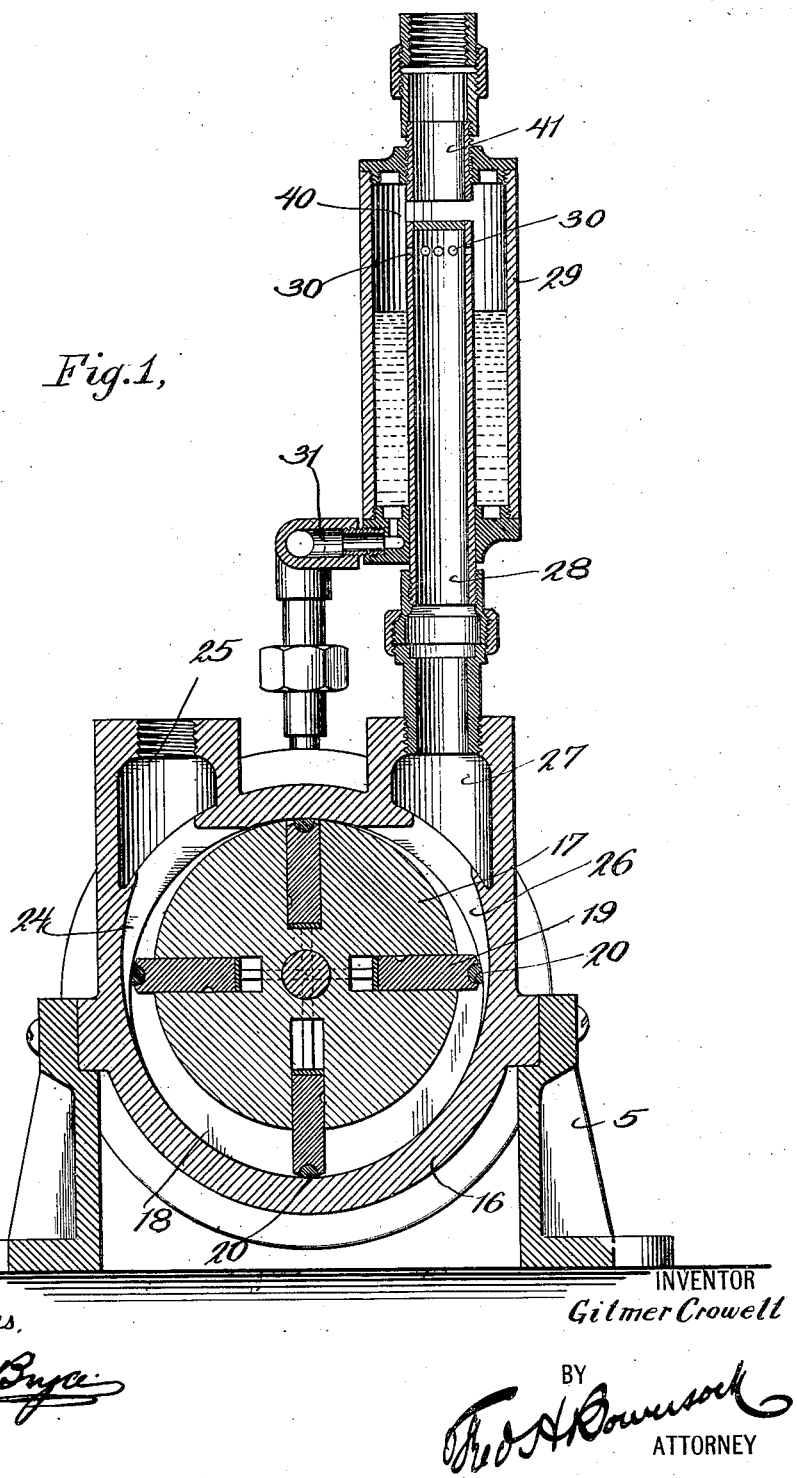
Fig.1,
WITNESSES:
INVENTOR
Gilmer Crowell
BY
ATTORNEY

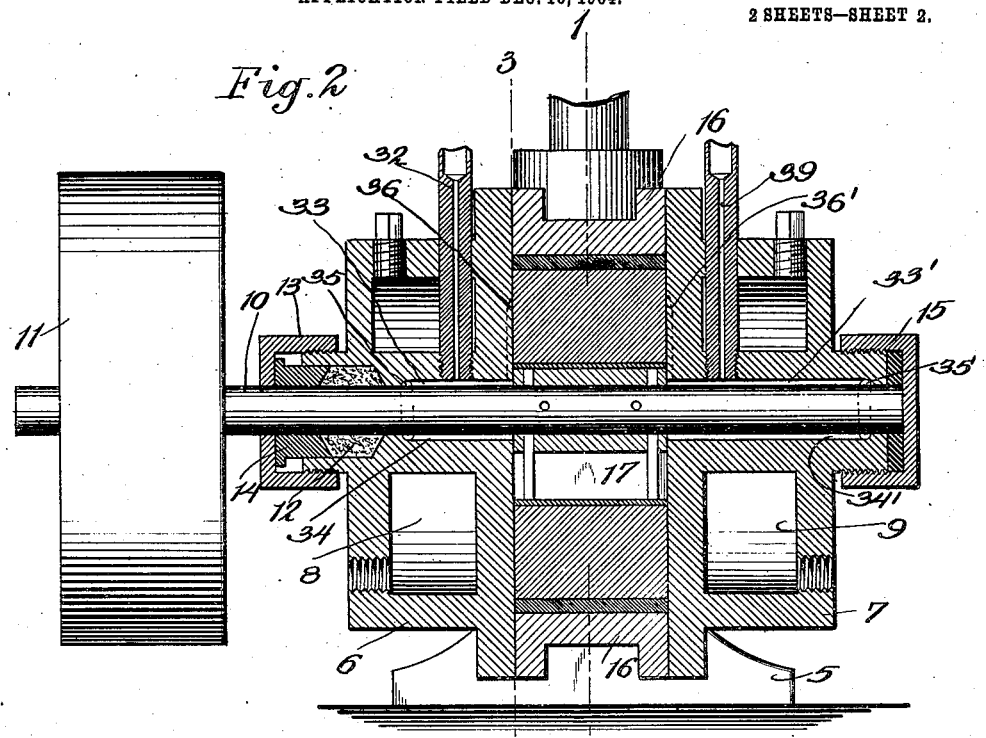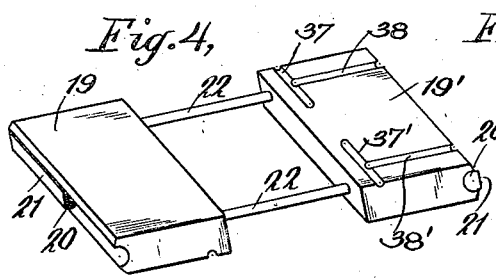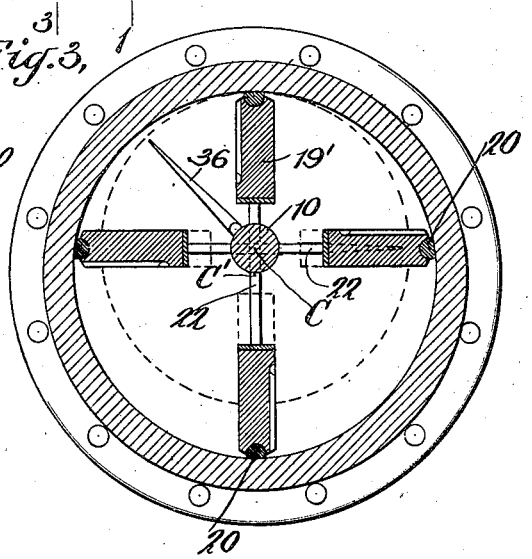

UNITED STATES PATENT OFFICE.

GILMER CROWELL, OF BROOKLYN, NEW YORK; JANE H. CROWELL EXECUTRIX OF SAID GILMER CROWELL, DECEASED.

LUBRICATING SYSTEM.

No. 848,446.  Specification of Letters Patent.  Patented March 26, 1907.

Application filed December 10, 1904. Serial No. 236,312.

*To all whom it may concern:*

Be it known that I, GILMER CROWELL, a citizen of the United States, residing at Brooklyn, in the county of Kings and State of New York, have invented certain new and useful Improvements in Lubricating Systems, of which the following is a specification.

This invention relates to lubricating devices, and particularly to means for providing a circulation of the lubricating agent from a suitable storage-reservoir to the bearings of a machine and back to said reservoir, whereby a certain volume of said agent may be used again and again with practically no waste and without loss of operative's time. I have particularly in mind means for properly lubricating the bearings of air-pumps of the rotary type designed to create either a pressure or a vacuum in which I employ a current of air to provide a vehicle to carry the lubricating agent to the bearings and back to the storage-chamber. Such devices generally require thorough lubrication, not positively insured where gravity alone is depended upon to cause the oil or other agent to reach the bearing-surfaces. I do not claim, broadly, the idea of employing force other than gravity in a general system of lubrication, as it is undoubtedly old in the art to utilize a separate device or machine to drive the oil under pressure to the bearing-surfaces of the machinery; but heretofore a separate machine or device has been employed for this purpose, while my invention contemplates a machine which is automatically self-lubricating in itself, particularly a machine adapted to store energy for specific purposes in which a portion of the available product-energy is utilized without extraneous power-generating means to keep a lubricating agent in circulation through the bearings of the machine.

The present invention is the result of an effort to provide for proper lubrication for the rotary air pumps or compressors shown, described, and claimed by me in Letters Patent of the United States Nos. 475,301 and 475,302, and in proceeding to describe a practical and convenient embodiment of the invention I shall for the purposes of this description consider it as applied to a machine of the type set forth in said Letters Patent, although it will be apparent that the principles involved may be with equal success applied to other and different forms of machinery.

My primary object is economy—economy of energy or power, economy of cost of equipment on application, economy of lubricating material, and economy of time of workmen, and, for the sake of economy, simplicity of construction and operation.

With the above and other ends in view my invention consists generally in a machine adapted primarily or incidentally to store energy and means for employing at least a portion of the energy stored to positively convey a predetermined quantity of the lubricating agent to the bearings of the machine. My invention further consists in novel means for maintaining a circulation of the lubricating agent from and to a suitable storage chamber or reservoir and including the bearing-surfaces of the machine.

My invention further and particularly consists in the combination, with an air-compressor, of an oil-container to which the compressed air has free access during operation of the machine, ducts leading from and to said container to and from the bearing-surfaces; and my invention further consists in novel means for keeping the lubricating agent constantly subject to a pressure tending to drive it in the proper direction, in means for insuring the return of said agent from the bearings to the storage-reservoir, in means for insuring thorough lubrication of all portions of each bearing-surface, in various details of construction and combinations of parts, all as hereinafter described, and particularly pointed out in the claims.

My invention will be more readily understood by reference to the accompanying drawings, forming a part of this specification, and in which—

Figure 1 is a sectional end elevation of a machine embodying my invention substantially on the line 1 1 of Fig. 2. Fig. 2 is a central longitudinal section of the same. Fig. 3 is a section substantially on the line 3 3 of Fig. 2. Fig. 4 is a detail in perspective hereinafter described.

Referring now to the drawings in detail, I prefer to mount the entire device upon a suitable supporting-base 5, to which is secured the parts making up the compressing-cylinder. These parts comprise the substantially similar heads 6 and 7, each provided with its annular chamber 8 and 9, respectively, to contain water in circulation for the usual purpose of cooling the working parts. These heads provide bearings for the shaft 10, driven by the pulley 11 thereon or in any other suitable manner, the head 6 being preferably provided with the packing-box 12, in which the usual packing may be subjected to the proper pressure by means of the screw-threaded cap 13, apertured for the shaft, acting against the member 14. The other head 7, through which the shaft 10 extends, is provided with a cap 15, hermetically sealing the journal-box at this end of the device.

The annular member 16, which with the heads 6 and 7 completes the compression-cylinder, may be secured to said heads in any suitable manner and is not of circular bore, but of interior configuration, departing from the circular in a manner and for a purpose hereinafter described. Nor does the shaft 10 pass through the approximate center of the chamber thus formed, but is eccentrically located, as hereinafter described.

Fixed upon the shaft 10 within the cylinder is the solid cylindrically-shaped member 17, equal in width to the interior width of the cylinder-chamber and the radius of which is equal to the shortest distance between the axial center of the shaft and the interior face of the annular member 16. When this member 17 is properly mounted within the chamber of the cylinder, a crescent-shaped space 18 is provided. The cylindrical member 17 is provided with four radially and rectangularly disposed slots substantially dividing said member into quadrants, opposite slots being connected by a pair of bores extending transversely through the shaft, the bores of each pair being non-intersecting with those of the other. Loosely fitted within each slot is a free piston 19 of substantially the same dimensions as the slot, having a limited sliding radial movement therein and rotating with said member 17. I prefer to provide each piston with a packing-strip 20, consisting of a cylindrically-shaped rod free within a correspondingly-shaped groove projecting slightly therefrom and having a substantially flat face 21, adapted to slide against the interior face of the annular member 16. Spacer-rods 22, identical in shape and dimensions, are interposed between opposite pistons through the bores referred to, preferably abutting against hardened face-plates 23, interposed between the ends of said rods and the faces of the pistons.

I have referred to the chamber provided by the annular member 16 as not being of circular bore. The interior configuration of this chamber is such that while the shaft 10 is located eccentric thereto the diameter of the chamber through the axis of the shaft is constant. If we consider the shaft as located, as shown, on the vertical axis of the chamber, the upper half of said chamber is bored to a true circle or is semicylindrical from a true center C. A horizontal line through the off center C' will therefore intersect the face of the member 16 at points equidistant from point C'. If this imaginary line is rotated about said off center C', with the original left end thereof constantly in contact with the semicircular face above said off center C', the other end of said line will describe the curve of the lower half of the bore of said chamber. The distances between the flat faces of the packing-strips in opposite pistons being constant, even though they rotate about an off center, said packing-strips will therefore be constantly in contact with the wall of the chamber.

It will be apparent that clockwise rotation of the shaft from the position indicated in Fig. 3 will result in the formation of a chamber which gradually increases in size until the member 17, and therewith the pistons, have rotated through an arc of one hundred and eighty degrees, after which said chamber gradually decreases in size until the starting position is reached. If we provide an inlet-port to the cylinder, located to open the smaller chamber to the atmosphere immediately after formation thereof, and keep the same open to the atmosphere until said chamber has reached its maximum size, air will be drawn into said chamber, which if confined within said chamber at this point will be subjected to compression upon continued rotation of said member 16, and may be discharged with considerable force through any suitable outlet-port. I therefore provide a groove 24, located substantially midway of the ends of the cylinder and extending from a point near the intersection of the vertical axis to a point just beyond intersection of the horizontal axis through the shaft. Communicating with this groove is the port 25, to which any preferred form of connection is adapted to be secured, open to the atmosphere in case the device is intended to be used as a compressor and communicating with the chamber from which it is desired to exhaust the air in case the device is intended to be used as a vacuum-pump. A similar groove 26 is similarly located in the opposite wall of the cylinder, with a similar port 27 communicating therewith.

Treating the device as an air-compressor, for which purpose it is primarily designed, I have shown a pipe 28 communicating with this last-mentioned port 27 and projecting into a preferably cylindrical receptacle or reservoir 29. The end of this pipe within said receptacle is closed, while an annular row of apertures 30 is provided communicating with the interior of said receptacle. From the bottom of said receptacle leads a duct 31, having a branch 32, leading to the longitudinal groove in the journal-bearings of the head 6. A similar groove is located on the opposite side of the bearings, the ends of both grooves being connected by an annular groove. On the inner face of the head 6, radially disposed thereon and communicating with the end of the groove, is the grooved channel terminating short of the periphery of the member 17 and preferably tapering, as shown. The forward face of each of the pistons is provided with a short grooved channel 37, adapted during each complete revolution of the member 17 to register once with the groove. Intersecting the groove 37 and leading therefrom to the outer edge of the piston is the groove 38. The other branch 39 of the duct 31 similarly leads to a similar groove 33' in the journal-bearings of the head 7. This bearing-surface is similarly provided with the opposite groove 34' and the annular connecting-groove 35'. A similar radial groove 36' in the head 7, which may or may not relatively correspond in location or inclination with the groove 36, similarly communicates with identical grooves 37' and 38' at the opposite end of each piston.

When the machine is in operation, air is taken in through the port 25 and forced under pressure through the pipe 28 and the apertures 30 30 therein into the chamber 40 above the level of the lubricating fluid therein. Leading from this chamber is the pipe 41 to conduct the air under pressure to any desired point of application. It will be apparent that there will always be air in the chamber 40 under pressure equal to that in the pipe 28, which pressure, acting against the lubricating fluid, forces a portion thereof constantly through the pipe 31 and its divided branches 32 and 39, driving the fluid into the grooves 33 and 33', respectively. From these grooves 33 and 33' the fluid is driven through the annular grooves 35 and 35' into the grooves 34 and 34', respectively, thus insuring thorough lubrication of the bearings of the shaft. From the inner ends of the grooves 33 and 33' the oil or lubricating fluid enters the radial grooves 36 and 36', respectively, insuring lubrication of the contact-surfaces between the member 17 and the heads 6 and 7, respectively. As explained, once during each revolution of said member 17 each of the pistons pass points where the ends of the grooves 37 and 37' therein register with the grooves 36 and 36', respectively. At these points, therefore, the oil is driven by compression into the connecting-grooves 37 and 38 at one end of said piston and the similar grooves 37' and 38' at the other end thereof. Through these grooves 38 and 38' the oil reaches the circular wall of the cylinder, thoroughly lubricating the friction-surface between the piston and the cylinder. Having reached the interior of the cylinder and being discharged into the expanding and contracting chambers, the oil is atomized by the pressure and the beating it receives from the rapidly-revolving pistons and in its atomized condition is carried by the discharging air-current up the pipe 28 and through the apertures 30 30 in the end thereof. The closed end of said pipe 28 within the chamber 40 and the projection of the final discharge-conduit 41 into said chamber causes a deflection in the air-current through said members, which results in the atomized oil settling on the walls within the chamber 40, where it accumulates, maintaining a comparatively constant supply therein, to be again and again circulated.

It will be obvious that the principles involved in the present invention may be applied with success to various types of machines for various purposes and that in such application the means employed for carrying such principles into practical use would necessarily be subject to various changes and modifications. Even in its application to an air-compressor of the rotary type, as described herein, many modifications of the details of construction and operation will doubtless readily suggest themselves to one skilled in the art to which the device appertains, and for these reasons I do not desire to limit my invention to the specific construction herein shown and described.

Having thus described my invention, I claim as new and desire to secure by Letters Patent—

1. The combination, with an air-pump, of an oil-reservoir through which the compressed air is deflected, and an oilway leading from said reservoir to the compression-chamber through the bearings of the machine.

2. The combination, with an air-pump and its discharge-conduit, of a sealed oil-reservoir in said conduit through which the compressed air is deflected, and an oilway leading from said reservoir to and terminating in the compressing-chamber, said oilway including the bearings of the machine.

3. The combination, with an air-compressor and its discharge-conduit, of a sealed oil-reservoir communicating with said conduit, and an oilway from said reservoir having branches leading direct to the bearings of the machine and therefrom to and terminating in the compressing-chamber.

4. The combination, with an air-pump, of an oil-reservoir, a pipe from the compressing-chamber leading thereinto, a final discharge-pipe leading therefrom, and suitable oilways leading from said reservoir to and terminating in the compressing-chamber, said oilways including the bearings of the machine.

5. The combination, with an air-pump and its discharge-conduit, of a sealed oil-reservoir located in said conduit and communicating therewith, an open oilway leading from said reservoir to the compressing-chamber through the bearings of the machine, and means for trapping the oil which is conveyed by the air in said conduit and returning the same to said reservoir.

6. The combination, with an air-pump, of an oil-reservoir, a pipe leading from the compressing-chamber to the upper portion of said reservoir, said pipe having a closed end and side apertures whereby the air-current is laterally deflected into said reservoir, a final discharge-pipe leading from said reservoir, and suitable oil-ducts leading from said reservoir to the compressing-chamber through the bearings of the machine.

7. The combination with the compressing-chamber of an air-pump and its discharge-pipe, of an oil-reservoir within which the discharge-pipe terminates, an air-pipe leading from the reservoir, oilways leading from the reservoir through the bearings of the machine to the compressing-chamber, means for forcing the oil with air from the compressing-chamber through the discharge-pipe into the reservoir, and means for causing the separation of the oil from the air within the reservoir.

8. The combination with the compressing-chamber of an air-pump and its discharge-pipe, of an oil-reservoir within which the discharge-pipe terminates, an air-pipe leading from the reservoir, oilways leading from the reservoir through the bearings of the machine to the compressing-chamber, means for forcing the oil with air from the compressing-chamber into the discharge-pipe and means for deflecting the air and oil from the discharge-pipe against the walls of the reservoir to effect their separation.

9. In an air-compressor, the combination of a cylinder provided with bearings, oil-ducts leading from said bearings to the inner faces of the ends of the cylinder, a shaft journaled in said bearings, sliding pistons carried by the shaft within the cylinder, oil-ducts leading from the sides of said pistons to their outer ends, said ducts being arranged to register with those in the ends of the cylinder when the shaft is rotated, an oil-reservoir, and ducts leading from said reservoir to those in the bearings.

10. In an air-compressor, the combination of a cylinder provided with bearings, oil-ducts leading from said bearings to the inner faces of the ends of the cylinder, a shaft journaled in said bearings, sliding pistons carried by the shaft within the cylinder, oil-ducts leading from the sides of said pistons to their outer ends, said ducts being arranged to register with those in the ends of the cylinder when the shaft is rotated, whereby the oil will pass from the ends of the pistons into the cylinder, an oil-reservoir, ducts leading from said reservoir to those in the bearings, a duct leading from the cylinder to the reservoir for conveying oil and air thereto, and means for effecting the separation of the oil and air within the reservoir.

In testimony of the foregoing I have hereunto set my hand in the presence of two subscribing witnesses.

GILMER CROWELL.

Witnesses:
E. R. HINDS,
FRANK T. MURRAY.